Figure 1:
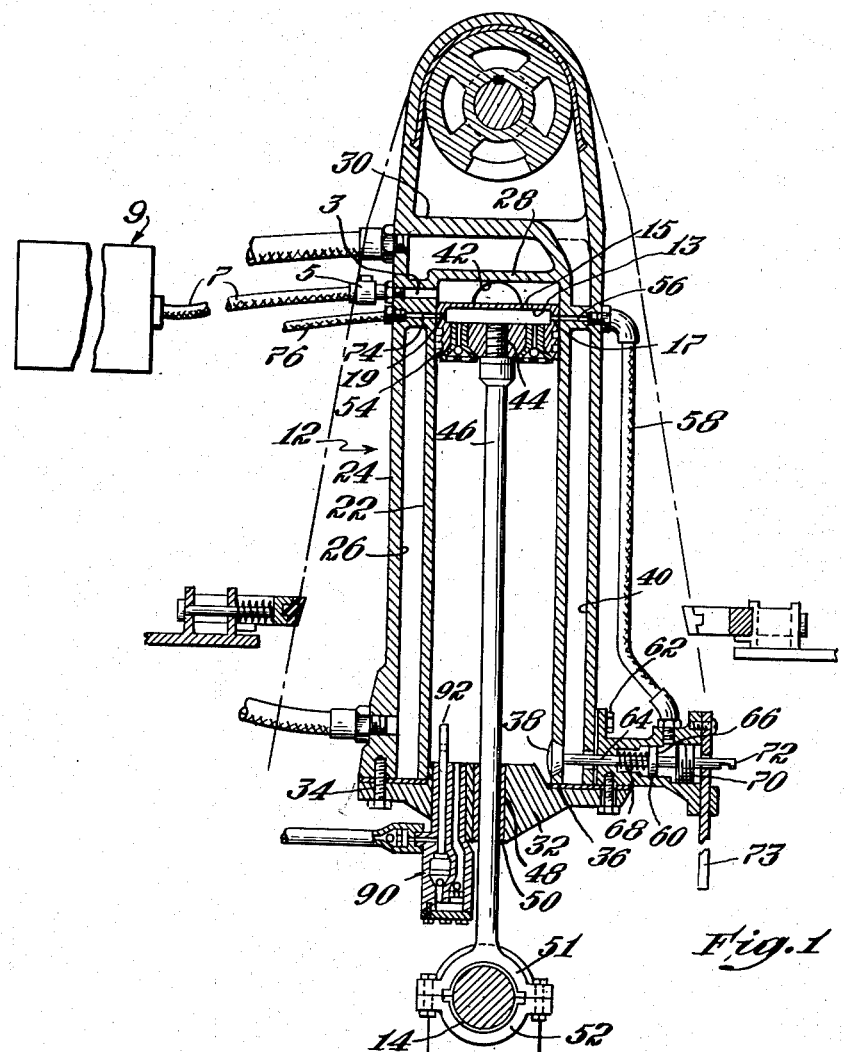

Sept. 21, 1954    L. C. WALES    2,689,679
HIGH-PRESSURE DIESEL ENGINE PUMP
Filed Feb. 25, 1953

Inventor
Lester C. Wales
by Roberts, Cushman & Groves
Att'ys.

Patented Sept. 21, 1954

2,689,679

UNITED STATES PATENT OFFICE 2,689,679

HIGH-PRESSURE DIESEL ENGINE PUMP

Lester C. Wales, Winthrop, Maine

Application February 25, 1953, Serial No. 338,722

6 Claims. (Cl. 230—56)

This invention relates to engines and more especially to internal combustion engines for pumping air into an accumulator for storage for the purpose of securing a source of high pressure air.

In my Patent No. 2,635,594 for Two-Cycle Diesel Engine, there is illustrated and described a two-cycle internal combustion diesel engine. As an incident of the operation of that engine air is compressed at one end of the piston stroke, a part of it being employed to operate the engine exhaust valve and a part to maintain a pressure on the fuel supply. As designed the pressure supplied by the aforesaid engine is approximately 25 pounds and the exhaust valve is designed to operate at that pressure. There are many instances when high pressure air is desirable, it being quite common to store air at 200 pounds pressure for operating pneumatic tools.

The principal object of this invention is to provide a diesel engine of the foregoing kind which will function primarily as a pump for supplying 200 pound pressure air to a storage chamber without substantial change in the construction and operation of the aforesaid engine and without changing the operating pressure of the exhaust valve as shown therein. A further and broader object of the invention is to provide an engine which will deliver air at different pressures, for example, high and low pressure. A further object is to provide means for adapting and/or converting a conventional internal combustion engine to serve as a pump for supplying high and low pressure air.

As herein illustrated in its simplest aspect a conventional cylinder and piston are employed and in accordance with the invention a pair of spaced valve ports are made in one end of the cylinder so that as the piston moves in the cylinder toward that end of the cylinder it covers one of the ports leaving the other port open so that the major part of the air compressed to a high pressure between the end of the piston and the end of the cylinder is discharged through the uncovered port to an accumulator or storage tank. In furtherance of the invention the piston has a hollow chamber in it from which a port opens through a wall in a location to be in registration with the covered port and a bleeder port through its end which permits some of the high pressure air to be metered into the chamber at a predetermined low pressure which is thus supplied to the covered port. The two ports may be connected by conduits to accumulators of different pressure capacity, however, in the illustrated engine herein, the high pressure, that is the uncovered port is connected to a high pressure accumulator and the low pressure or covered port to means for opening an exhaust valve at the opposite end of the cylinder preparatory to scavenging the spent gases from the cylinder upon the return stroke of the piston as in the aforementioned copending application.

Figure 2:
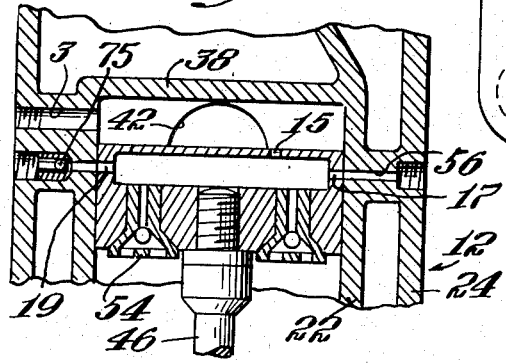

The invention will now be described in greater detail with reference to the accompanying drawings wherein:

Fig. 1 is a vertical section through one of the cylinders of a multicylinder two-cycle diesel engine such as illustrated in my aforesaid copending application; and Fig. 2 is an enlarged fragmentary diametrical section through the piston showing the internal chamber, the wall port and the bleeder port.

Referring to the drawings (Fig. 1) there is shown one cylinder block 12 of a multicylinder engine which contains a piston and piston rod, the details of which are to be described hereinafter, connected to a crankshaft 14 which in turn is connected to a drive shaft, not shown.

Each cylinder block 12 as illustrated in Fig. 2, has a cylinder 22 surrounded by a jacket 24 thereby providing an annular chamber 26 for a cooling fluid such as water. The upper end of the cylinder 22 is closed by a wall 28 and the upper end of the jacket 24 by a wall 30. An end member or bearing block 32 is bolted to the opposite end of the cylinder and jacket so as to close the same, the wall of the jacket being thickened at its lower end to receive bolts 34 for fastening the bearing block in place.

The cylinder block has at its lower end in the cylinder wall 22 an exhaust port 36 in which there is seated an exhaust valve 38. The exhaust port 36 is in direct communication with an exhaust passage 40 between the cylinder and jacket which is divided from the chamber 26 by suitable partitions 41 cast integral with the cylinder and jacket. The passage 40 extends from the lower end of the cylinder block upwardly to its upper end. At the upper end of the cylinder block there is an air intake valve port 42 in which there is a conventional intake valve, not shown, for admitting fresh air to the cylinder. Within the cylinder 22 there is a piston 44 fastened to one end of a piston rod 46, the opposite end of which passes through a hole 48 in the bearing block 32. The hole 48 is lined with a bearing sleeve 50 so as to provide a smooth sliding fit which is substantially gas tight. The end of the piston rod is joined by bearing yoke 51 and cap 52 to the crankshaft. The piston 44 has in it check valves 54 which will close as the piston moves downwardly within the cylinder, will remain closed during the greater part of the upward stroke following ignition and expansion of the fuel but will open at or near the upper end of the stroke to admit a charge of fresh air through them to the lower side of the piston for the purpose of scavenging the cylinder. In order to open the exhaust valve 38 during the scavenging operation and hence to permit the burned gases to be expelled through the exhaust valve 38 to the exhaust passage 40, a port 56 is formed at the upper end of the cylinder through its wall and the wall of the jacket and is connected by conduit 58 to a pilot cylinder 60 fastened to the lower end of the main cylinder by bolts 62 opposite the exhaust valve. The exhaust valve has a valve rod 64 fast to it which extends from the cylinder into the pilot cylinder and has on it a piston 66. A spring 68 is seated in the chamber behind the piston 66 and normally holds the exhaust valve closed, however, the latter will open when sufficient air pressure is admitted to the opposite side of the piston 66 by way of the by-pass 58. A gland 70 is threaded into the open end of the pilot cylinder 60 and a portion of the valve stem 64 passes therethrough and has at its end a notch 72. A latch member 73 is cooperable with the notch 72 to hold the valve 38 open during starting operations.

As thus illustrated in the aforementioned application during the upward movement of the piston 44 the air at the upper side of the piston is compressed and a part of it is forced through the conductor 58 and opens the exhaust valve 38 substantially simultaneously with the opening of the valves 54 in the piston 44 thereby permitting an inrush of fresh air to force the burned gases out through the exhaust port 36 and through the exhaust passage 40.

In accordance with the foregoing application, a second port 74 is made in the wall of the cylinder which contains a suitable check valve 75 (Fig. 2) through which air is delivered by way of a conduit 76 to the fuel supply to maintain a pressure on the fuel at all times.

The present invention departs from that of my pending application mentioned above in that an additional port 3 is made at or near the end of the cylinder which is connected by way of a check valve 5 and conduit 7 to an accumulator 9 for receiving at each upward stroke of the piston the major portion of the air compressed between the piston and the end of the cylinder and the ports 56 and 74 are relocated so that only a portion of the compressed air is delivered to them.

In order to attain the high pressure wanted the piston is made longer, that is while the length of the piston rod, stroke and cylinder are maintained the same as in the aforesaid patent, the axial thickness of the piston is increased, added to or built up at the compression side thereof so that when it reaches its full upward stroke there is much less space left between it and the end of the cylinder. By suitable design which may readily be calculated the pressure may be built up from the 25 pounds, which was attained in my former engine, to 200 pounds which is a useful pressure for storage for operating pneumatic tools. Since the exhaust valve as designed for the previous engine operates at approximately 25 pounds and since it is not desirable to use 200 pound pressure air for operating such a valve, and it is preferable not to change the construction, a part of the high pressure air is bled off to provide 25 pound pressure air suitable for operating the exhaust valve. To this end the piston 44 is made hollow so as to provide a chamber 13 of suitable size and two ports 15 and 17 are made in the piston, the port 15 at the top of the piston and the port 17 in its wall. The top port 15 is in the form of a metering orifice of small dimensions and as the piston moves upwardly and the pressure builds up ahead of it this orifice will permit just enough air to enter the chamber 13 to give the 25 pound pressure needed for operating the exhaust valve. The port 17 in the wall of the piston is placed so that it will register with the port 56 in the wall of the cylinder and hence permit passage of the 25 pound air to the exhaust valve operating piston 66. In order to supply 25 pound pressure air to keep the fuel under pressure the port 74 is located in the cylinder wall so as to be covered by the piston as is the port 56 to the exhaust valve and it is open to the internal chamber by another port 19 in the wall of the piston.

In a somewhat broader aspect of the invention instead of employing the port 56 to supply air to operate the exhaust valve, mechanical means can be used for that purpose and the ports 3 and 56 can be employed for supplying air at two different pressures, that is high pressure air and low pressure air to two different accumulators. Furthermore, the use of a chambered piston to produce compressed air at different pressures may be employed in other types of engines, for example, as illustrated in my copending application for Opposed Cylinder Stationary Engine, Serial No. 342,125, filed March 13, 1953.

As in the aforesaid application, the fuel is injected by injection means 90 located at the lower end of the cylinder. Since the fuel injection means corresponds to that shown in the foregoing application it need not be described herein except to point out that it includes a plunger rod 92 which is depressed by the piston to effect injection of the charge of fuel in the cylinder. Ignition takes place upon injection of the fuel and the expanding gases drive the piston upwardly in its power stroke. Near the upper end of its stroke the air at the upper side of the piston, that is between it and the upper end of the cylinder, is gradually compressed until it reaches approximately 200 pounds. During this time part of the air bleeds into the piston chamber filling the latter with 25 pound air which exceeds the pressure of the expanding gases at the opposite side of the cylinder when the piston has traveled approximately ⅚ of its stroke so that the air in the cylinder chamber forces the valves 54 in the lower part of the piston open and at the same time operates by way of the by-pass 58 on the piston 66 so as to open the exhaust valve 38. The 25 pound air in the piston chamber rushes through the valves 54 sweeping ahead of it the burned gases and discharges it through the exhaust port into the exhaust passage 40. As the piston 44 begins to descend the pressure below it begins to build up thus closing the valves 54. The pressure at the opposite side falls allowing the exhaust valve 38 to close under the influence of the spring 68 and compression of a fresh charge of air takes place as the piston continues to the bottom end of the cylinder accompanied by an inflow of fresh air through the intake valve 42 at the upper end of the cylinder. When the piston reaches the bottom of the cylinder, ignition takes place again as related above and the cycle once more is initiated.

The jacketing of the cylinders for cooling and the arrangement of the cylinders for oscillation as described in the foregoing application are not important to a clear understanding of the present invention since it may be employed in any type of engine hence these features will not be described further herein.

The invention is in no way limited to the engine herein illustrated as it is equally useful in an engine having stationary cylinders, either vertical or horizontally arranged, an engine of the latter kind being illustrated in my copending application.

It should be understood that the present disclosure is for the purpose of illustration only and that this invention includes all modifications and equivalents which fall within the scope of the appended claims.

I claim:

1. An internal combustion engine for supplying air at two different pressures, comprising a cylinder having near one end two ports, a piston movable in the cylinder toward said end to compress air ahead of it, said piston at a predetermined position covering one of the ports but not the other, the high pressure air ahead of the piston being discharged through said other port, a hollow chamber in the piston, a port in the wall of the piston located so as to be in registration with said one port at said predetermined position and a bleeder port in the end of the piston having communication with the chamber interiorly thereof, said bleeder port being designed to meter a predetermined quantity of said high pressure air into said chamber before it all escapes at a predetermined pressure lower than said high pressure air.

2. An engine for simultaneously supplying compressed air at different pressures comprising a cylinder, a piston operable in the cylinder to draw air into the cylinder on one stroke and to compress it on the successive stroke, a pair of ports near the compression end of the cylinder, a hollow chamber in the piston having a port in its wall registering with one port in the cylinder when the piston is at a predetermined position in its compression stroke, the other port in the cylinder being located beyond the piston when at said predetermined position so that high pressure air ahead of the piston is discharged through said other port and a bleeder port in the end of the piston in communication with said chamber through which a portion of the high pressure air ahead of the piston bleeds into said chamber at a predetermined lower pressure and from said chamber is supplied at said lower pressure to said one port.

3. In a two-cycle diesel engine a cylinder, a piston reciprocal therein to and from one end of the cylinder to compress air at said end, a port in the cylinder at said end through which air compressed to a high pressure ahead of the piston is forced, a second port in the cylinder spaced from the first port, said second port being covered by the wall of the piston when the latter reaches the end of its compression stroke, a hollow chamber in the piston, a port in the wall of the piston communicating with said chamber and in registration with said second port when the piston is at the end of its compression stroke and a bleeder port in the piston leading into the chamber, said bleeder port metering a predetermined quantity of high pressure air ahead of the piston into the chamber at a predetermined pressure and from thence through said second port.

4. An internal combustion engine according to claim 1, wherein one port is connected by way of a check valve to an accumulator.

5. An internal combustion engine according to claim 1, wherein an exhaust port is located near the opposite end of the cylinder, an exhaust valve normally closes said exhaust port, pressure operable means is connected with the exhaust valve to open and close it and means connecting said one port to said exhaust valve operating means.

6. An internal combustion engine according to claim 1, wherein an exhaust port is located near the opposite end of the cylinder, an exhaust valve normally closes said exhaust port, one of said ports supplies high pressure air to a storage accumulator and the other supplies low pressure air to means for opening said exhaust valve.

References Cited in the file of this patent

UNITED STATES PATENTS

| Number | Name | Date |
|---|---|---|
| 1,289,112 | Sowden | Mar. 25, 1919 |
| 2,172,751 | Heinrich | Sept. 12, 1939 |